(12) United States Patent
Ayarturk

(10) Patent No.: US 12,241,481 B2
(45) Date of Patent: Mar. 4, 2025

(54) PUMP

(71) Applicant: REPG ENERJI SISTEMLERI SANAYI VE TICARET ANONIM SIRKETI, Bursa (TR)

(72) Inventor: Hasan Ayarturk, Istanbul (TR)

(73) Assignee: REPG ENERJI SISTEMLERI SANAYI VE TICARET ANONIM SIRKETI, Bursa (TR)

( * ) Notice: Subject to any disclaimer, the term of this patent is extended or adjusted under 35 U.S.C. 154(b) by 35 days.

(21) Appl. No.: 18/038,452

(22) PCT Filed: Sep. 8, 2021

(86) PCT No.: PCT/TR2021/050905
§ 371 (c)(1),
(2) Date: May 24, 2023

(87) PCT Pub. No.: WO2022/119523
PCT Pub. Date: Jun. 9, 2022

(65) Prior Publication Data
US 2024/0011508 A1 Jan. 11, 2024

(30) Foreign Application Priority Data
Dec. 3, 2020 (TR) ................................. 2020/19646

(51) Int. Cl.
*F04F 5/10* (2006.01)
*B01D 61/42* (2006.01)
(Continued)

(52) U.S. Cl.
CPC ................ *F04F 5/10* (2013.01); *B01D 61/42* (2013.01); *F04F 5/44* (2013.01); *F04B 19/006* (2013.01);
(Continued)

(58) Field of Classification Search
CPC ........ F04F 5/10; F04F 5/44; F04F 5/54; F04F 5/42; B01D 61/42; B01D 61/427;
(Continued)

(56) References Cited

U.S. PATENT DOCUMENTS

| 5,896,435 A * | 4/1999 | Gautier ................. F22D 11/003 137/895 |
| 2011/0184389 A1 | 7/2011 | Grovender et al. |
| 2012/0292187 A1* | 11/2012 | Kim ....................... B01D 61/44 204/527 |

FOREIGN PATENT DOCUMENTS

| GB | 157118 A | 8/1921 |
| GB | 162642 A | 1/1922 |

(Continued)

OTHER PUBLICATIONS

JP2018158318 translation (Year: 2024).*

*Primary Examiner* — David N Brandt
(74) *Attorney, Agent, or Firm* — Bayramoglu Law Offices LLC

(57) ABSTRACT

A pump is provided, where the pressure of solutions in the pump, having electrical conductivity, can be increased without needing usage of mechanical parts. The pump includes: a primary medium associated with an input port of an ejector, a secondary medium associated with a suctioning port, a primary electrode provided in the primary medium, a secondary electrode provided in the secondary medium, a power supply associated to the primary electrode and the secondary electrode, an ion selective membrane and a pressure retaining membrane which separate the primary medium and the secondary medium from each other.

2 Claims, 1 Drawing Sheet

(51) Int. Cl.
*F04B 19/00* (2006.01)
*F04B 23/08* (2006.01)
*F04B 37/02* (2006.01)
*F04F 5/44* (2006.01)
*F04F 5/54* (2006.01)
*H01M 8/22* (2006.01)

(52) U.S. Cl.
CPC ............... *F04B 23/08* (2013.01); *F04B 37/02* (2013.01); *F04F 5/54* (2013.01); *H01M 8/227* (2013.01)

(58) Field of Classification Search
CPC ........ F04B 19/006; F04B 23/08; F04B 37/02; H01M 8/227
See application file for complete search history.

(56) References Cited

FOREIGN PATENT DOCUMENTS

| | | | | |
|---|---|---|---|---|
| JP | 2012062813 | A | 3/2012 | |
| JP | 2014161807 | A | 9/2014 | |
| JP | 2018158318 | * | 10/2018 | ............. B01D 61/24 |
| KR | 20100067830 | A | 6/2010 | |
| KR | 101488408 | B1 | 2/2015 | |
| TR | 202002107 | | 4/2014 | |
| TR | 202014597 | A2 | 11/2020 | |

* cited by examiner

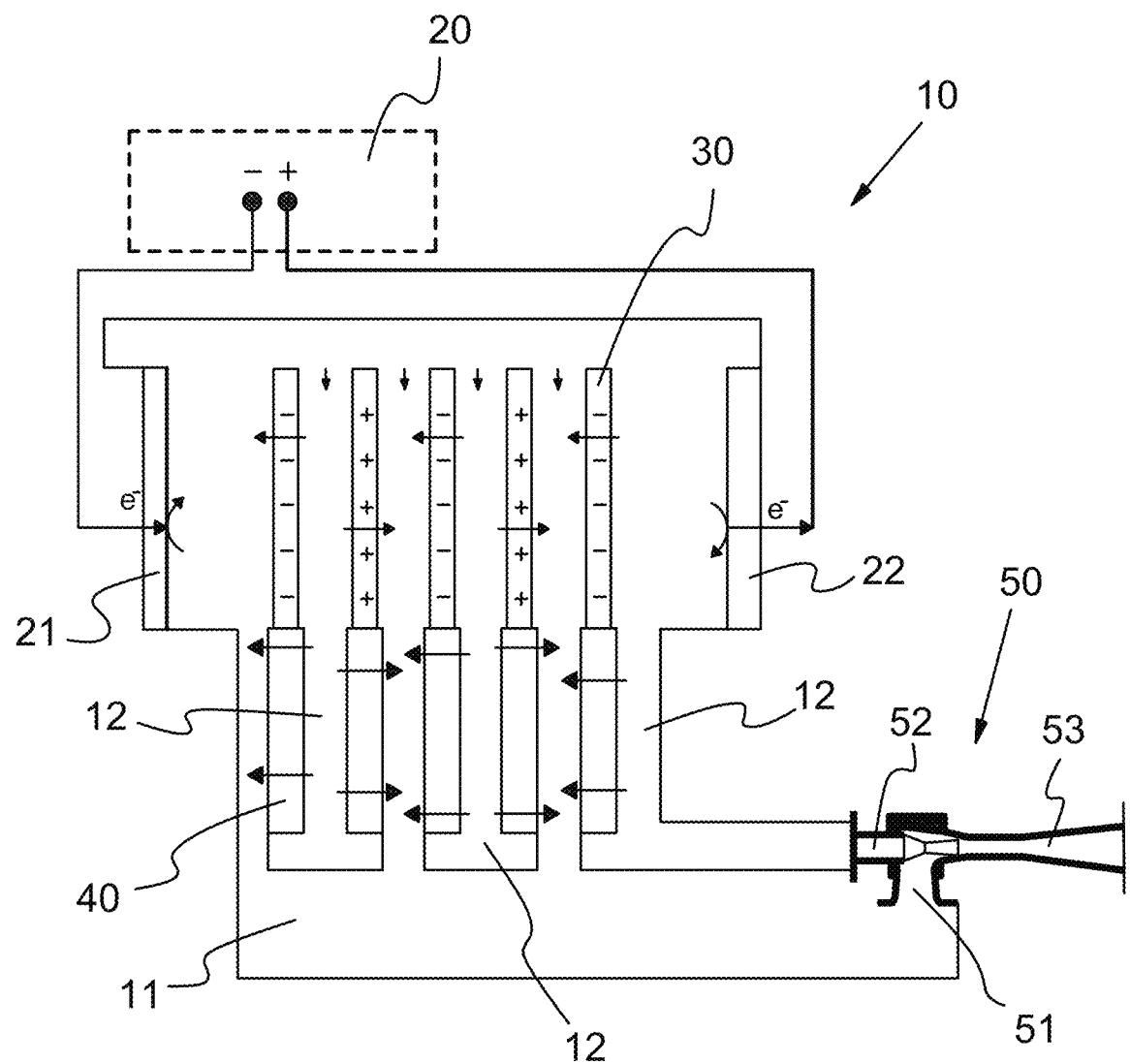

PUMP

CROSS REFERENCE TO THE RELATED APPLICATIONS

This application is the national phase entry of International Application No. PCT/TR2021/050905, filed on Sep. 8, 2021, which is based upon and claims priority to Turkish Patent Application No. 2020/19646, filed on Dec. 3, 2020, the entire contents of which are incorporated herein by reference.

TECHNICAL FIELD

The present invention relates to a pump where liquids can be pressured without needing usage of mechanical parts.

BACKGROUND

Pumps are machines which transform electrical energy into hydraulic energy and which move liquid by means of mechanical power. In other words, pumps provide stationary liquids to be pressurized and become movable. For providing this, mechanical parts are moved by means of the drive received from electrical motor, and the liquid displaces and pressurized by means of this movement.

The general problem with the pumps is the continuous energy need for operation and the maintenance need due to deformation of mechanical parts by time.

In the application with number KR20080126391, a pump is provided which provides spraying of disinfectant by producing osmotic pressure with the help of liquids which have different electrolyte densities.

The national patent application with number TR2020/02107 relates to magnetically combined pump arrangement. This pump arrangement comprises an inner area formed by a pump casing; a separation receptacle which hermetically seals the chamber according to the inner area formed by means of the pump arrangement; a wheel shaft driven around a rotation axis in a rotatable manner; a wheel arranged at one end of the wheel shaft, an inner rotor arranged at an end of the wheel shaft; an auxiliary wheel assembled to the chamber; and an outer rotor which functions together with the inner rotor. As seen in the pump mentioned here, the pump comprises pluralities of movable elements, and the pump is driven by the motor. This increases the maintenance and operation costs of the pump.

In the application with number US20110184389A1, an apparatus and a method are described which utilize osmotic pressure for pumping liquids like liquid medicines. The invention provides an osmotic pump liquid distribution apparatus comprising items designed for controlling liquid distribution proportion. The typical arrangements of the invention comprise an arrangement of elements like dissolving reservoirs which can change the dissolving substance concentrations in compartments of an osmotic pump, and an inner osmotic compartment for controlling liquid transfer from the pump. It is seen that this osmotic pump is driven by an external pump in order to operate at the mentioned conditions.

As a result, because of the abovementioned problems and because of the insufficiency of the present solutions about the subject, an improvement is required in the related technical field.

SUMMARY

The present invention relates to a pump, for eliminating the abovementioned disadvantages and for bringing new advantages to the related technical field.

An object of the present invention is to provide a pump where liquids can be pressured without needing usage of mechanical parts.

Another object of the present invention is to provide a pump which can increase the pressure of solutions which have electrical conductivity.

In order to realize the abovementioned objects and the objects which are to be deducted from the detailed description below, the present invention relates to a pump. Accordingly, the subject matter pump comprises a primary medium associated with an input port of an ejector, a secondary medium associated with a suctioning port, a primary electrode provided in said primary medium, a secondary electrode provided in said secondary medium, a power supply associated to said primary electrode and said secondary electrode, an ion selective membrane and a pressure retaining membrane which separate the primary medium and the secondary medium from each other. Thus, the solution with equal density is pressured by displacing between the first medium and the second medium and is pumped by means of the ejector.

In another possible embodiment of the present invention, solution with equal density which has electrical conductivity is provided in said primary medium and in said secondary medium.

BRIEF DESCRIPTION OF THE DRAWINGS

FIGURE shows a representative schematic view of the subject matter pump.

REFERENCE NUMBERS IN THE FIGURE

10 Pump
11 Primary medium
12 Secondary medium
20 Power supply
21 Primary electrode
22 Secondary electrode
30 Ion selective membrane
40 Pressure retaining membrane
50 Ejector
51 Input port
52 Suctioning port
53 Output port

DETAILED DESCRIPTION OF THE EMBODIMENTS

In this detailed description, the subject matter pump (10) is explained with references to examples without forming any restrictive effect only in order to make the subject more understandable.

In the subject matter pump (10), there is a primary medium (11) and a secondary medium (12) which are liquids having electrical conductivity and have equal density. The primary medium (11) and the secondary medium (12) are separated from each other by means of at least one ion selective membrane (30) and at least one pressure retaining membrane (40). Moreover, there is at least one primary electrode (21) provided in the primary medium (11), and there is at least one secondary electrode (22) provided in the secondary medium (12). Said primary electrode (21) and said secondary electrode (22) are connected to each other by means of a power supply (20). The pump (10) moreover has an ejector (50). An input port (51) of said ejector (50) is associated with the primary medium (11), and a suctioning port (52) of said ejector (50) is associated with the secondary medium (12).

In said embodiment, current is applied to the primary electrode (21) and to the secondary electrode (22) by the power supply (20). Here, said current can be provided from solutions which have electrical conductivity. Thanks to this current, an ion flow is formed between the primary medium (11) and the secondary medium (12) by means of the ion selective membrane (30). In more details, when the primary electrode (21) provided in the primary medium (11) is connected to the negative end (−) and when the secondary electrode (22) provided in the secondary medium (12) is connected to the positive end (+), ion passage takes place from the secondary medium (12) to the primary medium (11) by means of the ion selective membrane (30). Thus, density difference occurs between the two sides. Depending on this, solvent passage takes place from the less dense medium to the denser medium by means of the pressure retaining membrane (40). Since much more solution passage occurs when compared with ion passage, an osmotic pressure occurs. A flow occurs towards the input port (51) of the ejector (50) by means of the pressure which occurs in the primary medium (11). Meanwhile, solution is suctioned from the secondary medium (12), where the suctioning port (52) of the ejector (50) is connected, in accordance with the operation principles of ejectors (50). Thus, the solution coming from the primary medium (11) and suctioned from the secondary medium (12) is joined and is pumped through an output port (53) of the ejector (50). Since the solutions coming from the primary medium (11) and coming from the secondary medium (12) join in the ejector (50), a solution with the density, which exists at the beginning, is pumped by the ejector (50).

In said embodiment, the formed pressure and the solution amount pumped from the ejector (50) can be adjusted by changing the intensity of the electrical current applied from the power supply (20).

Since there is no movable part in the subject matter pump (10), the probability of deformation by time is eliminated, and a pump (10) is obtained which has long lifetime and which does not need maintenance.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

What is claimed is:

1. A pump comprising:
   a primary medium associated with an input port of an ejector,
   a secondary medium associated with a suctioning port,
   a primary electrode provided in the primary medium, said primary medium having electrical conductivity,
   a secondary electrode provided in the secondary medium, said secondary medium having electrical conductivity,
   a power supply coupled to the primary electrode and the secondary electrode, and
   an ion selective membrane and a pressure retaining membrane, wherein the ion selective membrane and the pressure retaining membrane separate the primary medium and the secondary medium from each other,
   wherein the pump is configured such that provision of power to the primary and secondary electrodes by the power supply causes ion flow through the ion selective membrane to cause a difference in density between the primary medium and the secondary medium, wherein the difference in density causes a solution flow between the primary and secondary mediums through the pressure retaining membrane, and wherein the solution flow generates a pressure that pumps a mixture of portions of the primary medium and the secondary medium out of the ejector.

2. The pump according to claim 1, wherein the pump is configured such that a density of the primary medium and a density of the secondary medium are equal prior to said provision of power.

* * * * *